United States Patent
Kumar et al.

(10) Patent No.: US 8,375,184 B2
(45) Date of Patent: Feb. 12, 2013

(54) MIRRORING DATA BETWEEN REDUNDANT STORAGE CONTROLLERS OF A STORAGE SYSTEM

(75) Inventors: Pankaj Kumar, Chandler, AZ (US);
Hang T. Nguyen, Tempe, AZ (US);
Mark Yarch, Chandler, AZ (US);
Timothy J. Jehl, Chandler, AZ (US);
John A. Miller, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 353 days.

(21) Appl. No.: 12/627,440

(22) Filed: Nov. 30, 2009

(65) Prior Publication Data

US 2011/0131373 A1    Jun. 2, 2011

(51) Int. Cl.
*G06F 12/00* (2006.01)

(52) U.S. Cl. ........ 711/162; 711/114; 711/119; 711/141; 711/173

(58) Field of Classification Search .................. None
See application file for complete search history.

(56) References Cited

U.S. PATENT DOCUMENTS

| 6,009,488 | A | 12/1999 | Kavipurapu |
| 6,321,298 | B1 | 11/2001 | Hubis |
| 2002/0053004 | A1 | 5/2002 | Pong |
| 2003/0110330 | A1* | 6/2003 | Fujie et al. .................... 710/36 |
| 2003/0158999 | A1 | 8/2003 | Hauck et al. |
| 2005/0138304 | A1 | 6/2005 | Ramakrishnan et al. |
| 2005/0182906 | A1* | 8/2005 | Chatterjee et al. ............ 711/144 |

OTHER PUBLICATIONS

Korean Patent Office, International Search Report and Written Opinion issued in corresponding PCT Application No. PCT/US2010/049940, dated May 30, 2011, 9 pgs.

* cited by examiner

*Primary Examiner* — Shawn X Gu
(74) *Attorney, Agent, or Firm* — Trop, Pruner & Hu, P.C.

(57) ABSTRACT

In one embodiment, the present invention includes canisters to control storage of data in a storage system including a plurality of disks. Each of multiple canisters may have a processor configured for uniprocessor mode and having an internal node identifier to identify the processor and an external node identifier to identify another processor with which it is to mirror cached data. The mirroring of cached data may be performed by communication of non-coherent transactions via the PtP interconnect, wherein the PtP interconnect is according to a cache coherent protocol. Other embodiments are described and claimed.

19 Claims, 3 Drawing Sheets

US 8,375,184 B2

MIRRORING DATA BETWEEN REDUNDANT STORAGE CONTROLLERS OF A STORAGE SYSTEM

BACKGROUND

Storage systems such as data storage systems typically include an external storage platform having redundant storage controllers, often referred to as canisters, redundant power supply, cooling solution, and an array of disks. The platform solution is designed to tolerate a single point failure with fully redundant input/output (I/O) paths and redundant controllers to keep data accessible. Both redundant canisters in an enclosure are connected through a passive backplane to enable a cache mirroring feature. When one canister fails, the other canister obtains the access to hard disks associated with the failing canister and continues to perform I/O tasks to the disks until the failed canister is serviced.

To enable redundant operation, system cache mirroring is performed between the canisters for all outstanding disk-bound I/O transactions. The mirroring operation primarily includes synchronizing the system caches of the canisters. While a single node failure may lose the contents of its local cache, a second copy is still retained in the cache of the redundant node. However, certain complexities exist in current systems, including the limitation of bandwidth consumed by the mirror operations and the latency required to perform such operations.

DETAILED DESCRIPTION

In various embodiments, an interconnect according to a point-to-point (PtP) communication protocol may be used as an inter-canister communication link to provide for cache mirroring. In one embodiment, the communication protocol may be in accordance with the Intel® Quick Path Interconnect (QPI) protocol. The QPI protocol is a cache coherent protocol that includes multiple layers including a physical layer, a link layer and a protocol layer. By using this protocol, coherent communications may be made in a system including multiple caching agents that can be processor cores or other such agents. The protocol provides for various communications over multiple channels and virtual networks along low latency links that provide for communication between devices coupled together via a PtP link.

While the QPI protocol is cache coherent and typically provided by way of board interconnects, e.g., motherboard routing traces to couple separate components such as multiple processors of a multiprocessor system, embodiments may use a QPI link to couple together different canisters, which may be interconnected via a backplane such as a mid-plane or in another off-board manner. The communications between these different canisters may be non-coherent, but yet implemented using the QPI protocol. As will be described, the logic of the QPI protocol may be modified to enable these non-coherent transactions, as although there may be multiple canisters provided, each may be configured as a uniprocessor (UP) system such that snoop transactions, which are part of the QPI cache coherent protocol, are not used. In contrast, conventional QPI links are used in non-UP system configurations as the cache coherent protocol provides for coherency between multiple caching agents.

In this way, the high performance and low latency properties of the QPI protocol can be used to free up other interconnects such as Peripheral Component Interconnect Express (PCI Express™ (PCIe™)) lanes that would otherwise be used for cache mirroring for serial-attached SCSI (SAS), and Fibre Channel (FC) interfaces for other I/O purposes. Thus, QPI acts as the gateway between the two canisters and provides isolation of local memory from/to the other canister while allowing each canister to independently manage its local resources. The QPI interconnect provides the bandwidth for cache mirroring and for messaging between two canisters for acknowledgements that data is mirrored to the redundant memory.

Figure 1:
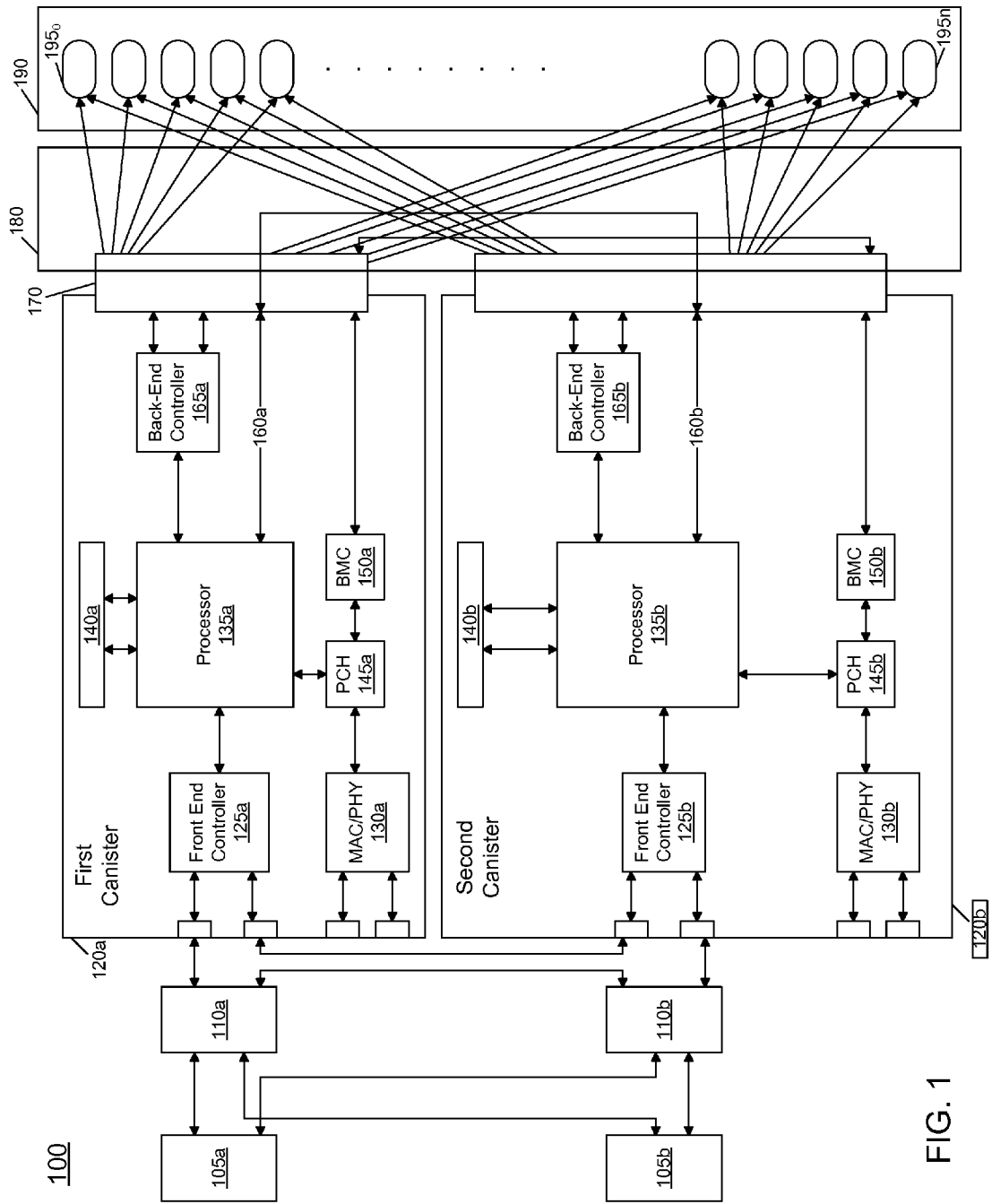
FIG. 1 is a block diagram of a system in accordance with an embodiment of the present invention.

Referring now to FIG. 1, shown is a block diagram of a system in accordance with an embodiment of the present invention. As shown in FIG. 1, system 100 may be a storage system in which multiple servers, e.g., servers $105_a$ and $105_b$ (generally servers 105) are connected to a mass storage system 190, which may include a plurality of disk drives $195_0$-$195_n$ (generally disk drives 195), which may be a redundant array of inexpensive disks (RAID) and may be according to a Fibre Channel/SAS/SATA model.

To realize communication between servers 105 and storage system 190, communications may flow through switches $110_a$ and $110_b$ (generally switches 110), which may be gigabit Ethernet (GigE)/Fibre Channel/SAS switches. In turn, these switches may communicate with a pair of canisters $120_a$ and $120_b$ (generally canisters 120). Each of these canisters may include various components to enable cache mirroring in accordance with an embodiment of the present invention.

Specifically, each canister may include a processor 135 (generally). For purposes of illustration first canister $120_a$ will be discussed and thus processor $135_a$ may be in communication with a front-end controller device $125_a$. In turn, processor $135_a$ may be in communication with a peripheral controller hub (PCH) $145_a$ that in turn may communicate with peripheral devices. Also, PCH 145 may be in communication with a media access controller/physical device (MAC/PHY) $130_a$ which in one embodiment may be a dual GigE MAC/PHY device to enable communication of, e.g., management information. Note that processor 135, may further be coupled to a baseboard management controller (BMC) $150_a$ that in turn may communicate with a mid-plane 180 via a system management (SM) bus.

Processor $135_a$ is further coupled to a memory $140_a$, which in one embodiment may be a dynamic random access memory (DRAM) implemented as dual in-line memory modules (DIMMs). In turn, the processor may be coupled to a back-end controller device $165_a$ that also couples to mid-plane 180 through mid-plane connector 170.

Furthermore, to enable mirroring in accordance with an embodiment of the present invention, a PtP interconnect 160 may be coupled between processor $135_a$ and mid-plane connector 170. As seen, a similar PtP interconnect may directly route communications from this link to a similar PtP interconnect $160_b$ that couples to processor $140_b$ of second canister $120_b$. In one embodiment, these links may be QPI links, as discussed above. As seen in FIG. 1, to enable redundant operation mid-plane 180 may enable communication from each canister to each corresponding disk drive 195. While shown with this particular implementation in the embodiment of FIG. 1, the scope of the present invention is not limited in this regard. For example, more or fewer servers and disk drives may be present, and in some embodiments additional canisters may also be provided.

Figure 2A:
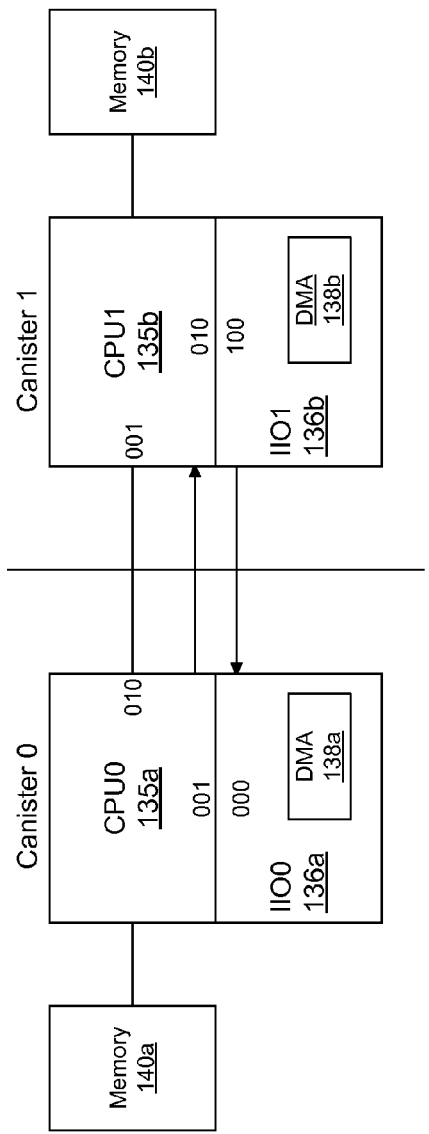
FIG. 2A is a block diagram of processors and associated memory for canisters in accordance with one embodiment of the present invention.
Figure 2B:
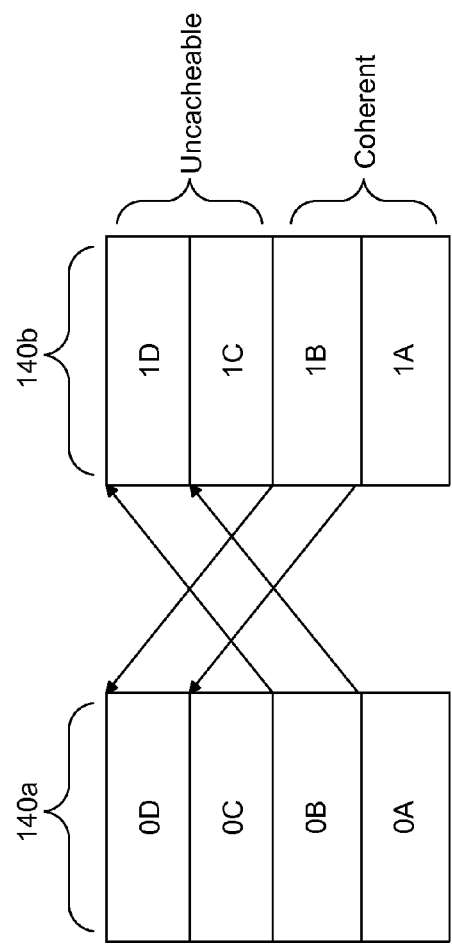
FIG. 2B is a block diagram of a system memory map in accordance with one embodiment of the present invention.

Referring now to FIG. 2A, shown is a block diagram of processors and associated memory for the canisters. As seen in FIG. 2A, a first canister may include a processor $135_a$, shown in FIG. 2A as CPU0, that may be set to have an internal node ID of 001 and an external node ID of 010, corresponding to the internal node ID for second processor $135_b$. As further seen, each processor $135_a$ may include an integrated IO (IIO) controller $136_a$ which may be identified by its own internal node ID (000 for first processor $135_a$ and 100 for second processor $135_b$) and which in turn may include an internal DMA engine 138. Each processor may also be coupled to its local memory 140. The mapping of the regions of the local memory is shown in FIG. 2B, described below.

In one embodiment, each processor may be formed on a single semiconductor die including one or more processor cores (e.g., represented as CPU0) and an IIO controller. In various embodiments, these agents may be coupled by way of an on-chip QPI link. This on-chip QPI link may be a conventional QPI link but without physical layers as part thereof. That is, because communication is on-chip, a link layer for the processor can communicate directly with a link layer for the IIO controller, improving communication. Further, while not shown in FIG. 2A, understand that an integrated memory controller may be present. In different implementations, the memory controller may be integrated within processor 135, and may be associated with memory $140_a$. However, in other embodiments, the memory controller may be a separate component or may be integrated within memory 140, e.g., as part of a DIMM. Similar components may be present in the second canister, which may similarly include a processor with an IIO controller, DMA engine, and which is associated with its own local memory.

Note that FIG. 2A shows an abstraction of the two independent canisters each with its own memory subsystem and integrated DMA engine. Even though each canister is a uniprocessor (UP) system, embodiments may use a dual processor (DP) capability of the CPU to perform data mirroring across the PtP interconnect. As one example, each CPU can be strapped to set its internal NodeIDs (000/001 for CPU0 and 100/010 for CPU1) and external NodeID (010 for CPU0 and 001 for CPU1), respectively. Each canister boots as a UP system but the DMA engine within each CPU is programmed to recognize its local CPU Node ID (001 for CPU0 and 010 for CPU1) and the remote CPU Node ID (010 for CPU0 and 001 for CPU1). Thus in contrast to a conventional UP system in which the separate processors of the two canisters would have the same node ID, different node IDs may be used to enable mirror operations in accordance with an embodiment of the present invention. The node IDs can be used to configure the system memory map.

Thus to configure each canister, the processors may be strapped to select NodeIDs per UP system and to select a SMBUS ID per UP system. In this way, both canisters boot up as UP systems. Thus the DMA engines are programmed to recognize the two CPU Node IDs (i.e., 001 and 010).

Referring now to FIG. 2B, shown is a block diagram of a system memory map in accordance with one embodiment of the present invention. As shown in FIG. 2B, separate system memories $140_a$ and $140_b$ are present in the two different canisters. Each memory may be partitioned into a coherent (e.g., cacheable) region and an uncacheable region. In general, the coherent region may be used for local memory access. Specifically, incoming write transactions and other data may be written into the coherent region, more specifically, a portion A of the coherent region. Any such information written into this coherent portion may be mirrored into portion B, also of the coherent region. It is this local memory region B that may be mirrored over to the other system memory, as shown with arrows in FIG. 2B. As seen, each memory further includes an uncacheable region including portions C and D. Note that portion C of each memory may act as a blocking region to separate the local memory region from the mirrored data region D.

Note that there is no snooping across the QPI link, since each system operates as a UP system. Region C may act as a software fencing mechanism to be used to ensure the data is mirrored to the redundant canister. The inbound memory transactions (non-snooped) on the QPI link are strongly ordered such that write transactions from the DMA engine complete in first-in first-out (FIFO) order to a write data buffer, e.g., of a memory controller and ultimately to the memory. The last DMA read transaction to the remote mirroring region guarantees that all prior DMA writes are written to system memory. In various embodiments, the system memory can be protected by a battery backup unit on the platform in the event of a power failure.

While shown with this particular implementation in the embodiment of FIG. 2B, the scope of the present invention is not limited in this regard. Thus during normal operation, each processor has access to its coherent regions of memory (A and B) only. When mirroring occurs, the DMA engine is used to move data from coherent memory on one node to uncacheable memory on the second node.

Figure 3:
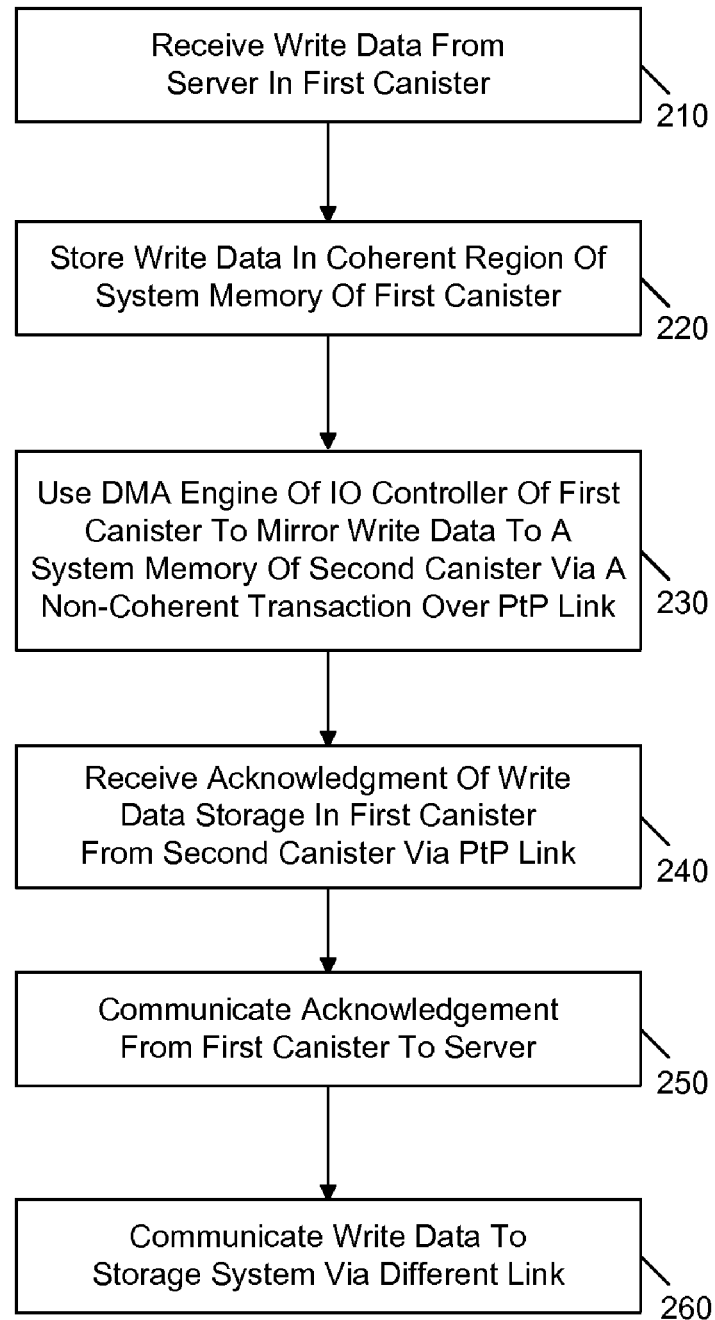
FIG. 3 is a flow diagram of a method in accordance with one embodiment of the present invention.

Referring now to FIG. 3, shown is a flow diagram of a method in accordance with one embodiment of the present invention. As shown in FIG. 3, method 200 may be used to perform cache mirroring between multiple canisters in accordance with an embodiment of the present invention. As shown in FIG. 3, method 200 may begin by receiving write data from a server in a first canister (block 210). For example, the canister may receive data to be sent to the storage system. As the transmission to the storage system may incur a latency, the data may first be stored in a coherent region of the system memory of the first canister (block 220). Thus the data is successfully stored in the canister such that the write transaction is cached and placed in line for later transmission to the storage system. Then, using a DMA engine of an I/O controller of the first canister (which may be an integrated I/O controller of a processor), the write data may be mirrored to a system memory of a second canister (block 230). More specifically, this communication of the write data from the first canister to the second canister may be by way of a PtP link, and in particular implementations a QPI link. Note that this transaction is a non-coherent transaction, although the QPI link is typically of a cache coherent protocol.

When the second canister receives the transaction and write data, it will write the data into its system memory, e.g., into an uncacheable region of the system memory. When the data is successfully written, the second canister may transmit an acknowledgement message back to the first canister. This message may also be transmitted along the QPI link.

Accordingly, the first canister may receive the acknowledgment message (block 240). Then the first canister may communicate the acknowledgement from a first canister back to the originating or source server (block 250). In this way, the server receives an early acknowledgement of the transaction such that resources allocated to the transaction can be released in the server. Note that mirroring can occur in both directions, such that cached data in the second canister may be mirrored over to the system memory of the first canister.

Referring still to FIG. 3, at a later time such as when bandwidth is available along another interconnect between the first canister and the storage system, the first canister may communicate the write data to the storage system (block 260). As discussed, this communication is via a different link, e.g., a PCIe, Fibre Channel or other such interconnect. Note that the communication may be performed more rapidly than if bandwidth were consumed on the same PCIe/Fibre Channel links for performing the cache mirroring transactions. While shown with this particular implementation in the embodiment of FIG. 3, the scope of the present invention is not limited in this regard.

Each canister may support managed hot-plug/removal operation. Embodiments can use features of QPI PHY/link layers to perform such operations. For example, an interrupt bit of a PITY layer control register can be set to enable/disable the QPI link, enable/disable termination, QPI PHY reset and L0 state (link status).

Using a QPI link for cache mirroring allows for higher bandwidth (BW) and lower latency between the two canisters. In addition, by using QPI links for mirroring, PCIe or other interconnects on the platform can be used to enable connection of more I/O devices versus being consumed for mirroring usage. This also removes complexities associated with varying the PCIe link, such as implementing a non-transparent bridge (NTB) feature or another protocol such as SAS and Fibre Controller for inter-canister link.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first canister to control storage of data in a storage system including a plurality of disks, the first canister having a first processor configured for uniprocessor mode and having a first internal node identifier, and a first system memory to cache data to be stored in the storage system; and
a second canister to control storage of data in the storage system and coupled to the first canister via a point-to-point (PtP) interconnect, the second canister including a second processor configured for uniprocessor mode and having a second internal node identifier and a second external node identifier to identify the first processor, and a second system memory to cache the data to be stored in the storage system, wherein the first and second system memories are to store a mirrored copy of data stored in the other system memory, wherein the mirrored copies are communicated by non-coherent transactions via the PtP interconnect, wherein the PtP interconnect is according to a cache coherent protocol and is modified to communicate between the first and second canisters without snoop transactions of the cache coherent protocol.

2. The apparatus of claim 1, wherein the first system memory is segmented into a cacheable portion to store cached data of the first canister and a second portion to store the mirrored copy of the data stored in the second system memory, the second portion uncacheable.

3. The apparatus of claim 1, wherein the first processor is to transmit an acknowledgment upon receipt of the mirrored copy of the second system memory data via the PtP interconnect, and the second processor is to transmit the acknowledgment to a server from which it received the data stored in the second system memory.

4. The apparatus of claim 1, wherein the first canister further includes a PCI (Peripheral Component Interconnect)-Express (PCIe) interconnect to communicate with a peripheral device coupled to the first canister, wherein the PCIe interconnect is to not communicate mirrored data.

5. The apparatus of claim 1, wherein the first processor includes an integrated input/output (I/O) controller having a third internal node identifier, the integrated I/O controller including a direct memory access (DMA) engine to use the second internal node identifier to communicate the mirrored copy of data stored in the first canister to the second canister.

6. The apparatus of claim 5, wherein the DMA engine is to communicate the mirrored copy of data stored in the first canister via the PtP interconnect.

7. The apparatus of claim 5, wherein the first processor includes at least one core coupled to the integrated I/O controller via an internal PtP interconnect, wherein the internal PtP interconnect does not include a physical layer.

8. The apparatus of claim 1, wherein the first canister is coupled to the second canister via a mid-plane, and a first PtP link of the first canister is coupled to a second PtP link of the mid-plane and the second PtP link is coupled to a third PtP link of the second canister.

9. A method comprising:
receiving write data from a first server in a first canister of a storage system, the first canister configured as a uniprocessor system;
storing the write data in a coherent region of a system memory of the first canister;
mirroring the write data to a system memory of a second canister of the storage system coupled to the first canister via a non-coherent transaction over a point-to-point (PtP) link according to a cache coherent protocol, the second canister configured as a uniprocessor system; and
receiving an acknowledgement of the write data storage in the second canister in the first canister from the second canister via the PtP link, and communicating the acknowledgement from the first canister to the first server, to enable the first server to release one or more resources allocated to the write data, prior to writing the write data from the first canister to a disk drive of the storage system.

10. The method of claim 9, further comprising using a direct memory access (DMA) engine of an input/output (I/O) controller of the first canister to minor the write data.

11. The method of claim 10, further comprising setting a first processor of the first canister to a uniprocessor configuration having a first internal node identifier to identify a processor of the first canister, a second node identifier to identify the I/O controller, and a first external node identifier to identify a processor of the second canister.

12. The method of claim 9, further comprising thereafter sending the write data from the first canister to the disk drive of the storage system via a second interconnect.

13. The method of claim 9, further comprising mirroring the write data to an uncacheable region of the system memory of the second canister.

14. The method of claim 9, further comprising mirroring second data stored in the system memory of the second canister to the system memory of the first canister via a second non-coherent transaction over the point-to-point link, wherein the mirrored second data is stored in an uncacheable region of the system memory of the first canister.

15. A system comprising:
a first canister to control storage of data in the system, the first canister having a first processor configured for uniprocessor mode and having a first internal node identifier to identify the first processor and a first external node identifier to identify a second processor of a second canister, and a first system memory to cache data to be stored in the system;
the second canister to control storage of data in the system and coupled to the first canister through a mid-plane via a point-to-point (PtP) interconnect, the second canister including the second processor configured for uniprocessor mode and having a second internal node identifier to identify the second processor and a second external node identifier to identify the first processor, and a second system memory to cache data to be stored in the storage system, wherein the first and second system memories are to store a mirrored copy of data stored in the other system memory, wherein the mirrored copies are communicated by non-coherent transactions via the PtP interconnect, wherein the PtP interconnect is according to a cache coherent protocol; and
a plurality of mass storage devices coupled to the first canister and the second canister through the mid-plane via a plurality of second interconnects having a different communication protocol than the cache coherent protocol, wherein the plurality of mass storage devices are to store cached data, and wherein the first processor is to transmit an acknowledgment upon receipt of the mirrored copy of the second system memory data via the PtP interconnect, and the second processor is to transmit the acknowledgment to a server from which it received the data stored in the second system memory prior to storage of the cached data in one or more of the plurality of mass storage devices.

16. The system of claim 15, wherein the first system memory is segmented into a cacheable portion to store cached data of the first canister and a second portion to store the mirrored copy of the data stored in the second system memory, the second portion uncacheable.

17. The system of claim 15, wherein the PtP interconnect is of a Quick Path Interconnect protocol and the plurality of second interconnects are of a PCI (Peripheral Component Interconnect) Express (PCIe) protocol.

18. The system of claim 15, wherein the first processor includes an integrated input/output (I/O) controller having a third internal node identifier to identify the integrated I/O controller, the integrated I/O controller including a direct memory access (DMA) engine to use the first external node identifier to communicate the mirrored copy of data stored in the first canister to the second canister.

19. The system of claim 18, wherein the first processor includes at least one core coupled to the integrated I/O controller via an internal PtP interconnect, wherein the internal PtP interconnect does not include a physical layer.

* * * * *

UNITED STATES PATENT AND TRADEMARK OFFICE
CERTIFICATE OF CORRECTION

PATENT NO. : 8,375,184 B2
APPLICATION NO. : 12/627440
DATED : February 12, 2013
INVENTOR(S) : Pankaj Kumar et al.

It is certified that error appears in the above-identified patent and that said Letters Patent is hereby corrected as shown below:

In the Specifications

Column 6, line 65:
"to minor" should be -- to mirror

Column 8, lines 12-13:
"the data stored" should be -- the cached data stored

Signed and Sealed this
Twenty-first Day of May, 2013

Teresa Stanek Rea
*Acting Director of the United States Patent and Trademark Office*